United States Patent
Ohno et al.

(10) Patent No.: US 7,794,815 B2
(45) Date of Patent: Sep. 14, 2010

(54) HONEYCOMB STRUCTURE

(75) Inventors: Kazushige Ohno, Gifu (JP); Masafumi Kunieda, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 97 days.

(21) Appl. No.: 11/475,967

(22) Filed: Jun. 28, 2006

(65) Prior Publication Data
US 2007/0004593 A1    Jan. 4, 2007

Related U.S. Application Data

(63) Continuation of application No. PCT/JP2006/307955, filed on Apr. 14, 2006.

(30) Foreign Application Priority Data

Jun. 29, 2005    (JP) .............................. 2005-190343

(51) Int. Cl.
| | |
|---|---|
| *B32B 3/12* | (2006.01) |
| *B01J 21/04* | (2006.01) |
| *C04B 33/34* | (2006.01) |
| *C04B 37/00* | (2006.01) |
| *B01D 39/06* | (2006.01) |
| *B01D 39/20* | (2006.01) |
| *B01D 39/14* | (2006.01) |
| *B01D 46/00* | (2006.01) |

(52) U.S. Cl. .................... 428/116; 502/439; 156/89.22; 55/523; 55/524; 55/529

(58) Field of Classification Search ............. 55/523, 55/385.3, 483, 502, 524, DIG. 30; 428/327, 428/116, 117, 119, 188, 690, 913; 502/439; 156/60, 89.11, 89.22
See application file for complete search history.

(56) References Cited

U.S. PATENT DOCUMENTS

2005/0169819 A1    8/2005    Shibata (Continued)

FOREIGN PATENT DOCUMENTS

EP    1142619 A1 *    10/2001

(Continued)

OTHER PUBLICATIONS

Ishikawa et al. Dewent Abstract of JP 05213681. Japanese publication date: Aug. 24, 1993.*

(Continued)

*Primary Examiner*—Steven Bos
*Assistant Examiner*—Anthony J Zimmer
(74) *Attorney, Agent, or Firm*—Finnegan, Henderson, Farabow, Garrett & Dunner LLP

(57) ABSTRACT

A honeycomb structure 20 is provided with multiple honeycomb units 10 having multiple through holes 12 arranged in parallel along the longitudinal direction, and a seal layer 26 for joining the units 10 via the outer faces 13 on which the through holes 12 are not opened. The honeycomb structure satisfies the expression $2 \leq A/B \leq 0.0002 \times C+5$ (about $28000 \leq C$), where A (g/cm$^3$) represents a product of the apparent density of the honeycomb unit 10 and volume ratio of the honeycomb unit 10 to the whole honeycomb structure, B (g/cm$^3$) represents a product of the apparent density of the seal layer 26 and volume ratio of the seal layer 26 to the whole honeycomb structure, and C (m$^2$/L) represents a specific surface area per unit volume of the honeycomb structure 20.

8 Claims, 5 Drawing Sheets

U.S. PATENT DOCUMENTS

| | | |
|---|---|---|
| 2005/0180898 A1 | 8/2005 | Yamada |
| 2005/0214504 A1 | 9/2005 | Yoshida |
| 2007/0077190 A1 | 4/2007 | Ohno |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |

FOREIGN PATENT DOCUMENTS

| | | |
|---|---|---|
| EP | 1 277 714 A1 | 1/2003 |
| EP | 1495790 | 1/2005 |
| EP | 1550646 | 7/2005 |
| EP | 1 598 102 A1 | 11/2005 |
| EP | 1489277 | 10/2007 |
| JP | 10-263416 | 10/1998 |
| JP | 2005-218935 | 8/2005 |
| JP | 2005-349378 | 12/2005 |
| WO | WO 03/081001 | 10/2003 |
| WO | WO 03/084640 | 10/2003 |
| WO | WO 2004/031101 | 4/2004 |
| WO | WO 2005075075 A1 * | 8/2005 |

OTHER PUBLICATIONS

International Preliminary Report on Patentability for International Application No. PCT/JP2006/307955, mailed Jan. 17, 2008.
Co-pending U.S. Appl. No. 12/194,888, filed Aug. 20, 2008.
Co-pending U.S. Appl. No. 12/238,057, filed Sep. 25, 2008.
Co-pending U.S. Appl. No. 12/245,821, filed Oct. 6, 2008.
Co-pending U.S. Appl. No. 12,246,899, filed Oct. 7, 2008.
Co-pending U.S. Appl. No. 12/246,881, filed Oct. 7, 2008.
Co-pending U.S. Appl. No. 12/239,342, filed Sep. 26, 2008.
Co-pending U.S. Appl. No. 12/246,913, filed Oct. 7, 2008.
Co-pending U.S. Appl. No. 12/246,869, filed Oct. 7, 2008.
Co-pending U.S. Appl. No. 12/248,647, filed Oct. 9, 2008.
Co-pending U.S. Appl. No. 12/248,675, filed Oct. 9, 2008.
European Search Report for EP application No. EP06013270 dated Dec. 20, 2006.
U.S. Appl. No. 11/925,394, filed Oct. 26, 2007.
U.S. Appl. No. 11/853,658, filed Sep. 11, 2007.
U.S. Appl. No. 11/928,546, filed Oct. 30, 2007.

* cited by examiner (a)

(b)

HONEYCOMB STRUCTURE

The present application is a continuation of PCT Application No. PCT/JP2006/307955, filed 14 Apr. 2006. The present application also claims priority to Japanese Patent Application No. 2005-190343, filed 29 Jun. 2005.

BACKGROUND OF THE INVENTION

1. Field of the Invention

The present invention relates to a honeycomb structure.

2. Description of the Related Art

A catalyst carrier used to convert an exhaust gas, in which a catalyst carrying layer such as active alumina is formed in through holes of a honeycomb structure has been conventionally known. Particularly, so as to raise the potential for bringing the exhaust gas into contact with a catalyst, there have been known a honeycomb structure having a cell shape having a hexagonal shape or circular shape, and another honeycomb structure which has a cell density of 600 to 1200 cells/inch$^2$ (cpsi) and in which a part existing in a depth of 100 μm from a surface is 80% or more of the volume of a catalyst carrying layer (refer to, for example, JP 10-263416 A). The contents of JP 10-263416 A are incorporated by reference herein.

SUMMARY OF THE INVENTION

A honeycomb structure of the present invention includes: multiple honeycomb units having multiple through holes; and a seal layer which joins adjacent honeycomb units with each other via respective closed outer faces of the multiple honeycomb units on which the through holes are not opened. This honeycomb structure satisfies the expression $2 \leq A/B \leq 0.0002 \times C+5$ (about $28000 \leq C$), where A (g/cm$^3$) represents a product of the apparent density of the honeycomb unit and volume ratio of the honeycomb unit to the whole honeycomb structure, B (g/cm$^3$) represents a product of the apparent density of the seal layer and volume ratio of the seal layer to the whole honeycomb structure, and C (m$^2$/L) represents a specific surface area per unit volume of the honeycomb structure.

In the honeycomb structure of the invention, it is preferable that the specific surface area C preferably satisfies about 35000 or more. It is further preferable that the specific surface area C satisfies about 70000 or less.

In the honeycomb structure of the invention, it is preferable that the product A is about 0.2 to about 0.5.

In the honeycomb structure of the invention, it is preferable that the thickness of the seal layer is about 0.1 mm to about 2.0 mm.

In the honeycomb structure of the invention, the honeycomb unit preferably contains inorganic particles and inorganic fibers, and the seal layer preferably contains inorganic particles which are the same as or different from the inorganic particles contained in the honeycomb unit and inorganic fibers which are the same as or different from the inorganic fibers contained in the honeycomb unit.

The honeycomb structure of the invention preferably carries a catalyst capable of converting an exhaust gas.

BRIEF DESCRIPTION OF THE DRAWINGS

FIG. 2A is a perspective view of the honeycomb unit 10 and FIG. 2B is an X-X sectional view of FIG. 2A.

DESCRIPTION OF THE PREFERRED EMBODIMENTS

Figure 1:
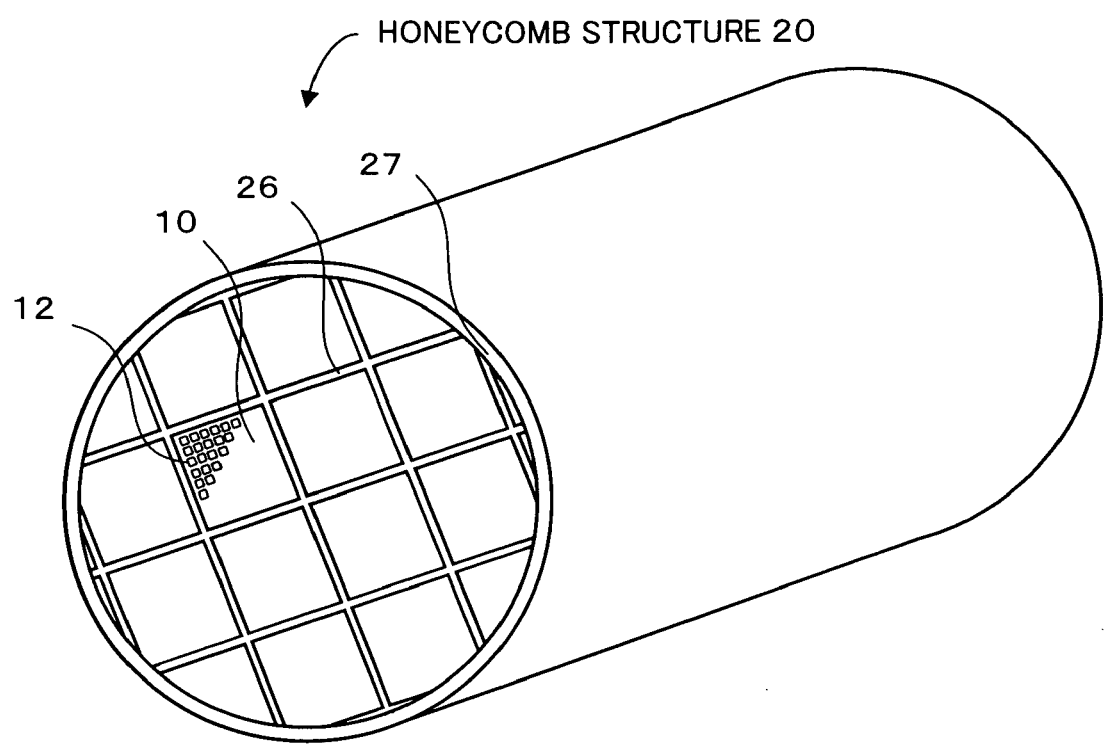
FIG. 1 is an explanatory view of a honeycomb structure 20 of the embodiment.

A honeycomb structure of one embodiment of the present invention includes multiple honeycomb units having multiple through holes and a seal layer which joins adjacent honeycomb units with each other via respective closed outer faces of the multiple honeycomb units on which the through holes are not opened. This honeycomb structure satisfies the expression $2 \leq A/B \leq 0.0002 \times C+5$ (about $28000 \leq C$), where A (g/cm$^3$) represents a product of the apparent density of the honeycomb unit and volume ratio of the honeycomb unit to the whole honeycomb structure, B (g/cm$^3$) represents a product of the apparent density of the seal layer and volume ratio of the seal layer to the whole honeycomb structure, and C (m$^2$/L) represents a specific surface area per unit volume of the honeycomb structure.

This honeycomb structure specifies the apparent density of the honeycomb unit to the whole honeycomb structure, the apparent density of the seal layer to the whole honeycomb structure and the specific surface area per unit volume of the honeycomb structure. As described above, the enhanced conversion efficiency of the exhaust gas is generally attained by raising the potential for bringing the exhaust gas into contact with the catalyst carried on the honeycomb structure. For this purpose, it is effective to increase the specific surface area of the catalyst carrier while decreasing the particle diameter of the carried catalyst and attaining sufficient high dispersion of the catalyst. Even when the amount of the catalyst is the same amount, the higher dispersion of the catalyst increases the specific surface area of the catalyst and thus enhances the potential for bringing the exhaust gas into contact with the catalyst. It is necessary to hold the temperature of the honeycomb structure at the activity temperature or more of the catalyst in the conversion of the exhaust gas. Herein, it is considered that the apparent density of the honeycomb unit and the apparent density of the seal layer formed on the outer face of the honeycomb unit influence the ease in getting heated and ease in cooling down or the like of the honeycomb structure. As the result of intensive studies based on the relationship between the apparent densities of the honeycomb unit and seal layer, and the specific surface area of the honeycomb structure in a honeycomb structure wherein multiple honeycomb units having multiple through holes are joined, the inventors of the present invention have found that when the honeycomb structure has the product A (g/cm$^3$) of the apparent density of the honeycomb unit and volume ratio of the honeycomb unit to the whole honeycomb structure, the product B (g/cm$^3$) of the apparent density of the seal layer and volume ratio of the seal layer to the whole honeycomb structure and the specific surface area C (m$^2$/L) per unit volume of the honeycomb structure, and satisfies $2 \leq A/B \leq 0.0002 \times C+5$ (about $28000 \leq C$), the conversion efficiency of the exhaust gas can be enhanced. The present invention was accomplished based on this finding.

In the honeycomb structure of the embodiment, furthermore, it is more preferable that the specific surface area C satisfies about 35000 cm$^2$/L or more, and most preferably about 38000 cm$^2$/L or more. When the C value is about 35000 m$^2$/L or more, the catalyst can be easily further highly dispersed. It is preferable that the specific surface area C satisfies about 70000 m²/L or less by taking into account the limit of dispersion of the catalyst.

In the honeycomb structure of the embodiment, it is more preferable that the product A satisfies about 0.2 g/cm³ to about 0.5 g/cm³. The product A of about 0.2 g/cm³ or more adequately prevents the strength of the honeycomb unit from being lowered. The product A of about 0.5 g/cm³ or less does not easily increase the heat capacity of the honeycomb structure and shortens time to reach to the activity temperature of the catalyst.

In the honeycomb structure of the embodiment, it is preferable that the thickness of the seal layer is about 0.1 mm to about 2.0 mm. When the thickness is about 0.1 mm or more, sufficient bonding strength of the honeycomb units is easily obtained. When the thickness is about 2.0 mm or less, the volume of the seal layer as a part which is not that much related to the catalyst reaction is not relatively increased, and thereby it is preferable in view of the conversion efficiency of the exhaust gas.

In the honeycomb structure of the embodiment, it is preferable that the honeycomb unit contains inorganic particles and inorganic fibers. Examples of the inorganic particles include one or multiple types of particles selected from alumina, silica, titania, zirconia, ceria, mullite, zeolite, or the like. Examples of the inorganic fibers include one or multiple types of fibers and whiskers selected from alumina, silica, silicon carbide, silica alumina, glass, potassium titanate and aluminum borate or the like. Thus, the honeycomb unit having high specific surface area and high strength can be comparatively easily produced. The honeycomb unit containing an inorganic binder is preferably manufactured in addition to this. Examples of the inorganic binders include one or multiple types of binders selected from alumina sol, silica sol, titania sol and water glass or the like. Thus, the sufficient strength can be obtained even at a low firing temperature.

In the honeycomb structure of the embodiment, it is preferable that the seal layer contains inorganic particles and inorganic fibers. Examples of the inorganic particles include one or multiple types of particles selected from ones described above, silicon carbide, boron carbide and silicon nitride or the like. Examples of the inorganic fibers include one or multiple types of fibers and whiskers selected from ones described above. The honeycomb structure containing an inorganic binder is preferably manufactured in addition to this. Examples of the inorganic binders include one or multiple types of binders selected from ones described above. Thus, the thermal shock resistance as the honeycomb structure can be enhanced, and the seal layer having a desired apparent density can be comparatively easily obtained.

A catalyst is preferably carried on the honeycomb structure of the embodiment. The catalyst used herein may be ones for converting CO, HC and NOx or the like contained in the exhaust gas, for example, noble metals, alkali metals, alkaline earth metals and oxidized compounds or the like. Examples of the noble metals include at least one type selected from platinum, palladium and rhodium or the like. Examples of the alkali metals include at least one type selected from sodium, potassium, or the like. Examples of the alkaline earth metals include at least one type selected from magnesium, barium or the like. Examples of the oxidized compounds include at least one type selected from ones ($LaCoO_3$, $LaMnO_3$ or the like) having a perovskite structure, $CeO_2$, or the like. As the oxidized compounds having the perovskite structure, for example, the A site of the perovskite structure (general formula $ABO_3$) used is at least one type of element selected from La, Y and Ce or the like. Of these, La is preferable, and examples thereof include one or more types of elements in which the B site of the general formula is selected from Fe, Co, Ni and Mn or the like. Some elements of the A site may be replaced with K, Sr and Ag or the like as in $La_{0.75}K_{0.25}CoO_3$ or the like. The honeycomb structure of the embodiment on which the catalyst is carried may be used for converting the exhaust gas of the vehicle.

Some modes of carrying out the present invention will be described below with reference to the drawings.

Figure 2:
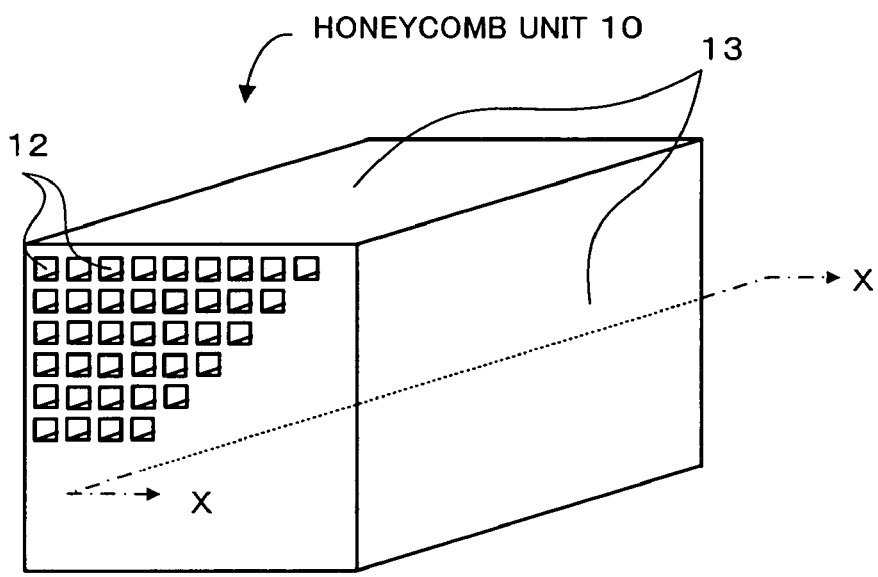
FIG. 2 is an explanatory view of a honeycomb unit 10 of the embodiment.
Figure 2:
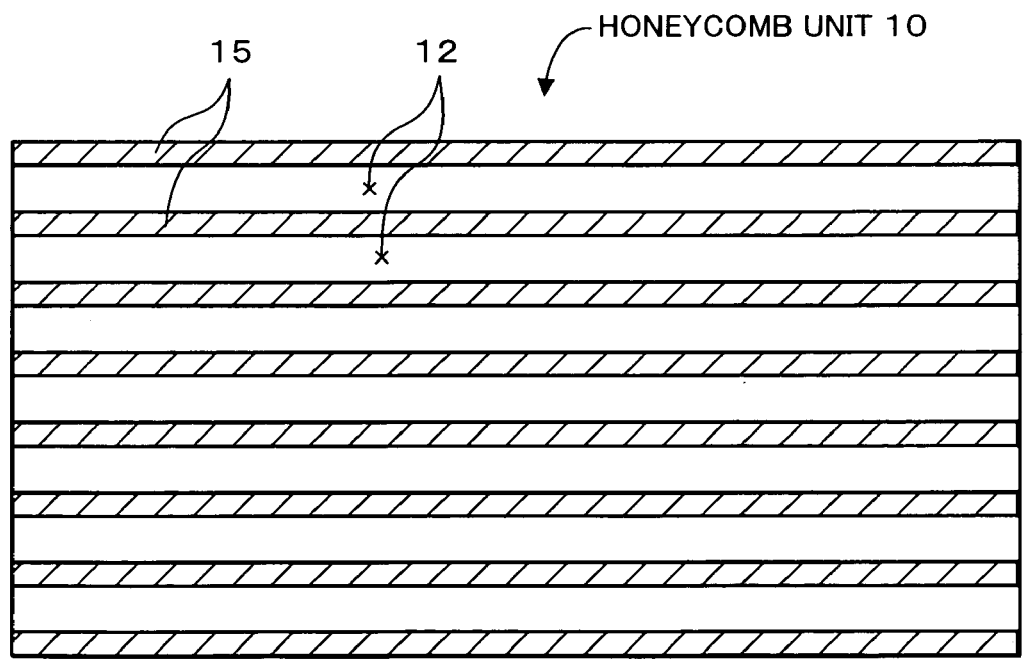

First, a honeycomb structure of the embodiment will be described. FIG. 1 is an explanatory view of a honeycomb structure 20 of the embodiment. FIG. 2 is an explanatory view of a honeycomb unit 10. FIG. 2A is a perspective view of the honeycomb unit 10 and FIG. 2B is an X-X sectional view of FIG. 2A. The honeycomb structure 20 is constituted as a honeycomb structure for catalyst converter having a function for converting toxic substances (for example, hydrocarbon HC, carbon monoxide CO and nitrogen oxide NOx or the like) in an exhaust gas of an engine. The honeycomb structure 20 is provided with multiple honeycomb units 10 having multiple through holes 12 arranged in parallel along the longitudinal direction and formed in the shape of a rectangular pillar, a seal layer 26 for joining the honeycomb units 10 via the outer faces 13 on which the through holes 12 are not opened, and a coating layer 27 for covering the outer circumferential face on which the through holes 12 are not opened among the multiple honeycomb units 10 joined by the seal layer 26.

Figure 3:
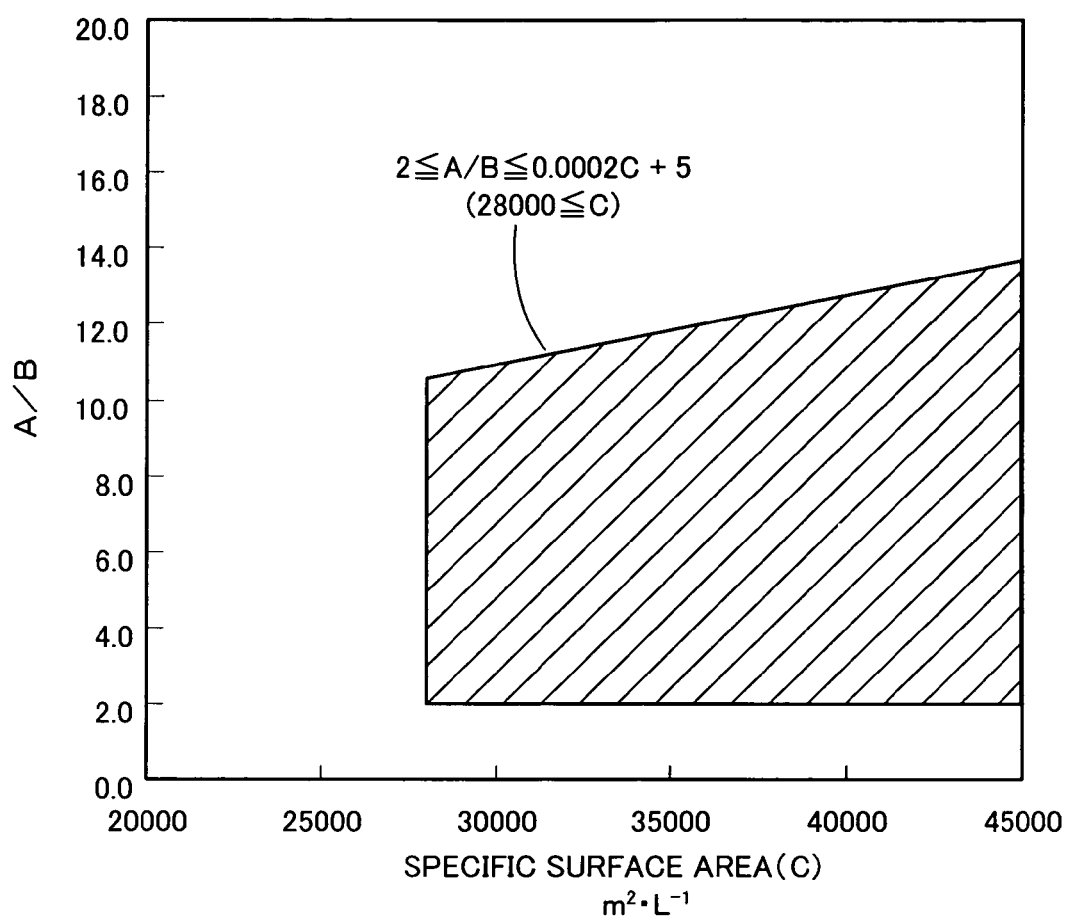
FIG. 3 shows an adequate range of A/B and specific surface area C per unit volume of the honeycomb structure 20.

The honeycomb structure 20 satisfies Formula (1); $2 \leq A/B \leq 0.0002 \times C + 5$ (about $28000 \leq C$), where A (g/cm³) represents a product of the apparent density of the honeycomb unit 10 and volume ratio of the honeycomb unit 10 to the whole honeycomb structure 20, B (g/cm³) represents a product of the apparent density of the seal layer 26 and volume ratio of the seal layer 26 to the whole honeycomb structure 20, and C (m²/L) represents a specific surface area per unit volume of the honeycomb structure 20. Herein, the product A is obtained by multiplying the apparent density (dry weight/volume) of the honeycomb unit 10 by the volume ratio of the honeycomb unit 10 to the volume of the whole honeycomb structure 20. The volume used so as to calculate the apparent density contains porosity and through holes (cells). It is preferable that the product A satisfies about 0.2 g/cm³ $\leq$ A $\leq$ about 0.5 g/cm³. When the product A is about 0.2 g/m³ or more, the strength of the honeycomb structure is not easily reduced. When the product A is about 0.5 g/cm³ or less, the heat capacity of the honeycomb structure is not easily increased and it does not take long time to reach to the activity temperature of the catalyst. The product B is obtained by multiplying the apparent density (dry weight/volume) of the seal layer 26 by the volume ratio of the seal layer 26 to the volume of the whole honeycomb structure 20. The specific surface area C per unit volume is obtained by calculating the specific surface area per unit volume containing the porosity and cell of the honeycomb unit from the specific surface area per unit weight due to the BET specific surface area measurement of the honeycomb unit 10 and by multiplying the volume ratio of the honeycomb unit 10 to the whole honeycomb structure 20. That is, since the seal layer 26 hardly contributes to the conversion of the exhaust gas, the volume of the seal layer 26 is excepted, and the specific surface area per volume of the honeycomb structure 20 is calculated. The specific surface area C needs to be about 28000 m²/L or more, more preferably about 35000 m²/L or more and most preferably about 38000 m²/L or more. Furthermore, it is preferable that the specific surface area C per unit volume satisfies about 70000 m²/L or less by taking into account the limit of dispersion of the catalyst. An adequate range of A/B as a ratio of A and B and specific surface area C per unit volume of the honeycomb structure 20 is shown in FIG. 3. When the honeycomb structure 20 is produced so as to be contained in the range, the conversion performance of the exhaust gas can be easily enhanced.

The honeycomb unit 10 has a square cross section perpendicular to the multiple through holes 12, and the honeycomb structure 20 obtained by joining the multiple honeycomb units 10 has a cylindrical outer shape. The honeycomb unit 10 may have, for example, a square, rectangle, hexagon or fan-shaped cross section perpendicular to the multiple through holes 12. The honeycomb structure 20 may have, for example, rectangle or oval cross section perpendicular to the multiple through holes 12.

The through holes 12 formed in the honeycomb unit 10 have a square cross section. The through holes 12 may have a triangle or hexagon cross section. The thickness of a wall part 15 (wall thickness) between adjoining through holes 12 is in a range of about 0.05 mm to about 0.35 mm, more preferably about 0.10 mm to about 0.30 mm, and most preferably about 0.15 mm to about 0.25 mm. Since the wall thickness of about 0.05 mm or more does not easily reduce the strength of the honeycomb unit 10, and the wall thickness of about 0.35 mm or less easily causes the contact between the exhaust gas and the catalyst carried in the wall part 15, the catalyst performance is not reduced. The number of the through holes per unit cross section area (cell density) is preferably in a range of about 15.5 to about 186 cells/cm$^2$ (about 100 to about 1200 cpsi), more preferably in a range of about 46.5 to about 170.5 cells/cm$^2$ (about 300 to about 1100 cpsi), and most preferably in a range of about 62.0 to about 155 cells/cm$^2$ (about 400 to about 1000 cpsi). The number of the through holes of about 15.5 cells/cm$^2$ or more does not easily reduce the area of the walls inside the honeycomb unit 11 which are in contact with the exhaust gas, and the number of the through holes of about 186 cells/cm$^2$ or less does not easily increase a pressure loss and makes it easier to produce the honeycomb unit 10. The porosity of the honeycomb unit 10 is preferably about 30% to about 80%, and more preferably about 40% to about 70%. The porosity of about 30% or more does not easily cause an increase in apparent density, and the porosity of about 80% or less does not cause a reduction in strength.

Referring to the size of the honeycomb unit 10, it is preferable that the cross section area of the unit is about 5 to about 50 cm$^2$, more preferably about 6 to about 40 cm$^2$, and most preferably about 8 to about 30 cm$^2$. In this range, the large specific surface area per unit volume of the honeycomb structure 20 can be kept, and the catalyst can highly be dispersed. Also, even if an external force such as thermal shocks and vibration is added, the shape as the honeycomb structure can easily be held. A ratio of the total sum of the cross section area of the honeycomb unit 10 to the cross section area of the honeycomb structure 20 (hereinafter, referred to as unit area ratio) is preferably about 85% or more, and more preferably about 90% or more. When the ratio is about 85% or more, it is preferable that the surface area on which the catalyst is carried is not relatively reduced or the pressure loss is not easily increased.

The honeycomb unit 10 is manufactured so as to contain alumina particles as inorganic particles, aluminum borate whisker as inorganic fibers and silica sol as an inorganic binder. As the inorganic particles, for example, one or multiple types of particles selected from silica, titania, zirconia, ceria, mullite and zeolite or the like may be contained. As the inorganic fibers, for example, one or multiple types of fibers and whiskers selected from alumina, silica, silicon carbide, silica alumina, glass and potassium titanate or the like may be contained. As the inorganic binder, for example, one or multiple types of binders selected from alumina sol, titania sol and water glass or the like may be contained.

The seal layer 26 contains the silicon carbide as the inorganic particles, an alumina fiber as the inorganic fibers and the silica sol as the inorganic binder. These inorganic particles may contain ones described in the honeycomb unit 10 described above and one or multiple types of particles selected from boron carbide and silicon nitride or the like. The inorganic fibers and the inorganic binder may be selected from ones described in the honeycomb unit 10 described above. It is preferable that the porosity of the seal layer 26 is about 10% to about 80%, and more preferably about 15% to about 70%. When the porosity is about 10% or more, the apparent density is not easily increased, and it becomes easier to reach to a catalyst activity temperature. When the porosity is about 80% or less, it is preferable that the strength for joining the honeycomb unit 10 is not easily reduced.

Referring to the honeycomb structure 20, platinum as an oxidation catalyst is directly carried on the wall part 15. In the case of noble metals such as platinum, it is preferable that the amount of the catalyst is about 1 to about 5 g/L at the weight of the catalyst per unit volume of the honeycomb structure 20. Although the method of carriage of the catalyst is not particularly limited, it is preferable that an impregnation method is comparatively simple.

In the honeycomb structure of the embodiment of the invention, the specific surface area per unit volume can be large so as to raise the potential for bringing exhaust gas into contact with catalyst, without devising cell shape or cell density. Thus, sufficient high disperse of the catalyst can be realized. In addition, the conversion efficiency of the exhaust gas can be enhanced by setting the apparent density and specific surface area of the honeycomb structure to the adequate range.

Next, the manufacturing method of the honeycomb structure 20 of one embodiment of the present invention will be described according to each process. Herein, the method for manufacturing the honeycomb structure 20 using alumina as the main components will be described. First, the alumina particles as the inorganic particles, the aluminum borate whisker as the inorganic fibers and the silica sol as the inorganic binder are mixed to prepare a material paste. As the inorganic particles, the inorganic fibers and the inorganic binder, for example, ones described in the honeycomb unit 10 described above may be used. The material paste may further include an organic binder, a dispersion medium, and a molding agent according to the moldability. The organic binder used here is, for example, one or multiple types selected among methylcellulose, carboxymethylcellulose, hydroxyethylcellulose, polyethyleneglycol, phenol resin, and epoxy resin. The content of the organic binder is preferably in a range of about 1 to about 10 mass parts relative to the total 100 mass parts of the alumina particles, aluminum borate whisker and silica sol. The dispersion medium used here is, for example, water, an organic solvent, such as benzene, or an alcohol, such as methanol. The molding agent used here is, for example, ethyleneglycol, dextrin, a fatty acid, fatty acid soap, polyalcohol, or the like. The materials may be mixed in a mixer or an attritor or the like, and may be sufficiently kneaded in a kneader or the like. The material paste is molded to the honeycomb shape having through holes, for example, by extrusion molding or the like.

Next, the method dries the molded body obtained. As a dryer, for example, a microwave dryer and a hot air dryer or the like are used. The method preferably degreases the molded body when adding the organic binder or the like. The degreasing conditions are appropriately selected according to the types and the amounts of organic substances included in the molded body, for example, about 400° C. for about 2 hours. Next, the molded body dried and degreased is fired at about 600° C. to about 1000° C. The firing temperature of about 600° C. or more adequately advances the sintering of the inorganic particles or the like and the strength of the honeycomb structure is not easily reduced. The firing temperature of about 1000° C. or less does not excessively advance sintering of the inorganic particles or the like and the specific surface area is not easily reduced and sufficient high dispersion of the carried catalyst can be easily achieved. The method accordingly gives the honeycomb unit 10 having the multiple through holes.

The obtained multiple honeycomb units 10 are successively joined with one another by means of a sealing paste as a seal layer, be dried, and be solidified to form a seal layer 26 and produce a honeycomb unit assembly. The sealing paste is prepared by mixing silicon carbide particles as the inorganic particles, alumina fibers as the inorganic fibers and silica sol as the inorganic binder. Herein, as the sealing paste, a mixture of the inorganic binder and inorganic particles, a mixture of the inorganic binder and inorganic fibers, or a mixture of the inorganic binder, inorganic particles and inorganic fibers or the like may be used. As the inorganic particles, the inorganic fibers and the inorganic binder, for example, ones described in the seal layer 26 described above may be used. The sealing paste may further include an organic binder. The organic binder used here may be at least one selected from polyvinyl alcohol, methylcellulose, ethylcellulose, carboxymethylcellulose, or the like. This sealing paste is appropriately prepared so that the range of Formula (1) described above is satisfied after solidification of the sealing paste. The thickness of the seal layer for joining adjacent honeycomb units 10 with each other is preferably in a range of about 0.1 mm to about 2.0 mm. It is preferable that the thickness of the seal layer of about 0.1 mm or more easily gives a sufficient bonding strength. It is preferable that the thickness of the seal layer of about 2.0 mm or less does not easily reduce the specific surface area per unit volume of the honeycomb structure. This is because the seal layer does not function that much, as the catalyst carrier. The number of the honeycomb units 10 joined together may be adequately determined for the desirable size of the honeycomb structure 20 used. Then, the honeycomb unit assembly is adequately cut or polished according to the desired size of the honeycomb structure 20. The method applies, dries, and solidifies a coating material paste onto the outer circumferential face (side face) of the units on which the through holes are not opened to form a coating layer 27. The coating layer can protect the outer circumferential face and thus the strength of the honeycomb structure is easily enhanced. The coating material paste may have an identical composition and mixing ratio with or a different composition and mixing ratio from those of the sealing material. The thickness of the coating layer is preferably in a range of about 0.1 mm to about 2 mm. This assembly is calcined to constitute the honeycomb carrier (representing the honeycomb structure prior to carriage of the catalyst). The preliminary calcinations conditions are appropriately determined according to the types and the amounts of the included organic substances, for example, about 700° C. for about 2 hours.

Then, the catalyst is carried on the obtained honeycomb carrier. Herein, platinum as an oxidation catalyst is carried. First, after a solution containing the catalyst is prepared and the honeycomb carrier is immersed in the solution, the honeycomb carrier is pulled up, and the excessive solution remaining in the through hole 12 or the like is removed by suction. The honeycomb carrier is dried at about 80° C. to about 200° C. and fired at about 500° C. to about 700° C., and thereby the honeycomb structure 20 on which the catalyst is carried can be obtained. When some kinds of catalysts are carried, a process for immersing the honeycomb carrier in the solution of the catalyst and firing may be repeated for each catalyst. The amount of the catalyst is appropriately selected according to the kind and combination or the like thereof. Referring to the carriage of the catalyst, the catalyst may be carried after production of the honeycomb carrier, may be carried on the inorganic particles as a raw material, or may be carried when the honeycomb unit 10 is produced.

In accordance with the honeycomb structure 20 of the embodiment described above in detail, $2 \leqq A/B \leqq 0.0002 \times C+5$ (about $28000 \leqq C$) is satisfied, and thereby the conversion efficiency of the exhaust gas can be enhanced. By setting the thickness of the seal layer to about 0.1 mm to about 2.0 mm, the sufficient bonding strength of the honeycomb units can be easily obtained, and a part which is not that much related to the catalyst reaction can be reduced to easily enhance the conversion efficiency of the exhaust gas.

The present invention is not limited to the embodiment described above, and it is a matter of course that various aspects can be performed as long as they belong to the technical scope of the present invention.

EXAMPLES

Hereinafter, examples in which the honeycomb structures 20 are in particular manufactured will be described.

Example 1

First, γ alumina particles (KC-501 manufactured by Sumitomo Chemical Co., Ltd., average particle diameter: 1 μm) of 2250 mass parts, aluminum borate whisker (average fiber length: 20 μm, average fiber diameter: 0.5 μm) of 680 mass parts, silica sol (solid concentration: 30% by weight) of 2600 mass parts as an inorganic binder, methyl cellulose (MC) of 320 mass parts as an organic binder, water, a plasticizer (glycerin) and a lubricant (trade name: uniloop, manufactured by NOF Corporation) were added, mixed and kneaded in a proper quantity to give a mixed composition. Then, the mixed composition was extrusion molded into a shape of a square pillar having multiple through holes arranged in parallel along the longitudinal direction by an extruder to a raw molded body. The raw molded body was sufficiently dried with a microwave dryer and a hot air dryer and was kept at 400° C. for 2 hours for degreasing. The degreased molded body was fired at 800° C. for 2 hours to give a square-pillar (34.3 mm×34.3 mm×75 mm) honeycomb unit 10 (hereinafter, this sample is referred to as "honeycomb 1") having a cell density of 93 cells/cm$^2$ (600 cpsi), a wall thickness of 0.2 mm and a cell shape of a square. The numerical values of the amount of the constituting material (base material) of this honeycomb 1, silica sol and methyl cellulose or the like and firing temperatures or the like are summarized in Table 1. The numerical values of apparent density, porosity and specific surface area per unit volume or the like as the measurement results of samples are also shown in Table 1, and the specifications of honeycombs 2 to 5 to be described later are also collectively shown. The apparent density of the obtained honeycomb 1 was 0.45 g/cm$^3$, the porosity was 60%, and the specific surface areas per the unit volume was 40000 m$^2$/L. The calculation method of the apparent density, porosity and specific surface area per the unit volume will be described later.

TABLE 1

| | γ-alumina | | Titania | | Silica | | Aluminum Borate Whisker g | Silica Sol g | Methyl Cellulose g | Firing Temp. °C. | Apparent Density g/cm3 | Porosity % | Specific Surface Area m2/L |
|---|---|---|---|---|---|---|---|---|---|---|---|---|---|
| | D μm | Amount g | D μm | Amount g | D μm | Amount g | | | | | | | |
| Honeycomb 1 | 1 | 2250 | | | | | 680 | 2600 | 320 | 800 | 0.45 | 60 | 40000 |
| Honeycomb 2 | | | 2 | 2250 | | | 680 | 2600 | 320 | 800 | 0.50 | 60 | 38000 |
| Honeycomb 3 | | | | | 2 | 2250 | 680 | 2600 | 320 | 850 | 0.32 | 60 | 30000 |
| Honeycomb 4 | 1 | 1500 | | | 2 | 750 | 680 | 2600 | 320 | 800 | 0.40 | 60 | 42000 |
| Honeycomb 5 | 1 | 2250 | | | | | 680 | 2600 | 320 | 1000 | 0.45 | 60 | 28000 |

1) All of foneycombs 1 to 5 have the wall thickness of 0.2 mm, the cell density of 600 cpsi, and the opening ratio of 65.1%.
2) Honeycomb 1: Examples 1 to 8, Honeycomb 2: Examples 9 to 12, Honeycomb 3: Examples 13 to 17, Honeycomb 4: Examples 18 to 21, Honeycomb 5: Examples 22 and 23
3) D: diameter Then, silicon carbide particles (average particle diameter: 0.5 μm) of 3600 mass parts, alumina fibers (average fiber diameter: 10 μm, average fiber length: 100 μm, aspect ratio: 10) of 5500 mass parts, silica sol of 3000 mass parts as an inorganic binder (solid concentration: 30% by weight), carboxymethyl cellulose (CMC) of 50 mass parts as an organic binder and water were mixed in a proper quantity to prepare a sealing paste (referred to as seal material 1). The numerical values of the amounts or the like of the constituting material of this seal material 1, silica sol and CMC or the like are shown in Table 2. The measurement results of the apparent density and porosity after solidification as the evaluation result of the seal material are also shown in Table 2, and the specifications of the seal material 2 to 4 to be described later are also collectively shown. The sealing paste was applied on the outer surface 13 of the honeycomb 1 so that the thickness of the sealing paste is set to 1 mm, and four honeycomb units 10 in the longitudinal direction and four honeycomb units 10 in the latitudinal direction are joined to obtain an assembly. Each honeycomb structure assembly was cut with a diamond cutter into a cylindrical shape having a substantially symmetric front face with respect to a point. The cylindrical outer surface having no through hole was coated with the sealing paste in a thickness of 0.5 mm to form a coating material layer 27 on the outer circumferential face. The cylindrical honeycomb structure assembly was dried at 120° C. and was kept at 700° C. for 2 hours for degreasing of the seal layer 26 and the coating layer 27. This gave the cylindrical honeycomb carrier (135 mm in diameter×75 mm in height).

Next, platinum was carried on the obtained honeycomb carrier. A platinum nitrate solution of 0.25 mol/L was prepared. The platinum nitrate solution was made to absorb in the honeycomb carrier so that the amount of the platinum becomes 5.0 g/L at the weight of the platinum per the unit volume of the honeycomb structure, and the honeycomb structure was fired at 600° C. for 1 h. In this way, the honeycomb structures 20 (Example 1) on which the catalyst shown in FIG. 1 were carried was obtained. Numerical values of the unit kind, base material, ratio of unit area, product A prior to carriage of the catalyst, kind of the seal layer, ratio of the seal layer area, thickness of the seal layer and product B prior to carriage of the catalyst of the Example 1 are shown in Table 3. Herein, the ratio of the seal layer area represents a ratio of the total sum of the cross section area of the seal layer 26 to the cross section area of the honeycomb structure 20. The product A (g/cm$^3$) means the product of the apparent density of the honeycomb unit 10 and volume ratio of the honeycomb unit 10 to the whole honeycomb structure 20, and was calculated by Formula (2) to be described later. The product B (g/cm$^3$) means the product of the apparent density of the seal layer 26 and volume ratio of the seal layer 26 to the whole honeycomb structure 20, and was calculated by Formula (3) to be described later. The specifications of the Examples 2 to 24 to be described later are also collectively shown in Table 3. The specific surface area per unit volume of the obtained honeycomb structure 20 of the Example 1 was 37400 m$^2$/L, and the unit area ratio thereof was 93.5%. The specific surface area per unit volume was calculated by Formula (4) described later.

TABLE 2

| | SiC | | Alumina | | Alumina Fiber g | Aluminum Borate Whisker g | Silica Sol g | CMC g | Apparent | |
|---|---|---|---|---|---|---|---|---|---|---|
| | Diameter μm | Amount g | Diameter μm | Amount g | | | | | Density g/cm$^3$ | Porosity % |
| Seal Material 1 | 0.5 | 3600 | | | 5500 | | 3000 | 50 | 1.82 | 45 |
| Seal Material 2 | | | 0.5 | 3600 | 5500 | | 3000 | 50 | 1.93 | 45 |
| Seal Material 3 | 0.5 | 8000 | | | 1100 | | 3000 | 50 | 2.72 | 15 |
| Seal Material 4 | 0.5 | 1100 | | | | 8000 | 3000 | 50 | 0.87 | 70 |

* Seal Material 1: Examples 1 to 5, 9, 14, 16, 18, 22
Seal Material 2: Examples 6, 10, 15, 20
Seal Material 3: Examples 7, 12, 13, 21
Seal Material 4: Examples 8, 11, 17, 19, 23

TABLE 3

| | Unit | Base material | Unit Area Ratio[1] % | A[2] g/cm³ | Seal Layer | Ratio of Seal Layer Area[3] % | Thickness of Seal Layer mm | B[4] g/cm³ |
|---|---|---|---|---|---|---|---|---|
| Example 1 | Honeycomb 1 | γ-alumina | 93.5 | 0.42 | Seal layer 1 | 6.5 | 1.0 | 0.12 |
| Example 2 | Honeycomb 1 | γ-alumina | 89.0 | 0.40 | Seal layer 1 | 11.0 | 1.7 | 0.20 |
| Example 3 | Honeycomb 1 | γ-alumina | 98.0 | 0.44 | Seal layer 1 | 2.0 | 0.3 | 0.04 |
| Example 4 | Honeycomb 1 | γ-alumina | 87.0 | 0.39 | Seal layer 1 | 13.0 | 2.0 | 0.24 |
| Example 5 | Honeycomb 1 | γ-alumina | 98.5 | 0.44 | Seal layer 1 | 1.5 | 0.2 | 0.03 |
| Example 6 | Honeycomb 1 | γ-alumina | 95.0 | 0.43 | Seal layer 2 | 5.0 | 0.8 | 0.10 |
| Example 7 | Honeycomb 1 | γ-alumina | 97.0 | 0.44 | Seal layer 3 | 3.0 | 0.5 | 0.08 |
| Example 8 | Honeycomb 1 | γ-alumina | 96.5 | 0.43 | Seal layer 4 | 3.5 | 0.5 | 0.03 |
| Example 9 | Honeycomb 2 | Titania | 93.5 | 0.47 | Seal layer 1 | 6.5 | 1.0 | 0.12 |
| Example 10 | Honeycomb 2 | Titania | 97.0 | 0.49 | Seal layer 2 | 3.0 | 0.5 | 0.06 |
| Example 11 | Honeycomb 2 | Titania | 95.0 | 0.48 | Seal layer 4 | 5.0 | 0.8 | 0.04 |
| Example 12 | Honeycomb 2 | Titania | 97.0 | 0.49 | Seal layer 3 | 3.0 | 0.5 | 0.08 |
| Example 13 | Honeycomb 3 | Silica | 93.5 | 0.30 | Seal layer 3 | 6.5 | 1.0 | 0.18 |
| Example 14 | Honeycomb 3 | Silica | 98.5 | 0.32 | Seal layer 1 | 1.5 | 0.2 | 0.03 |
| Example 15 | Honeycomb 3 | Silica | 98.5 | 0.32 | Seal layer 2 | 1.5 | 0.2 | 0.03 |
| Example 16 | Honeycomb 3 | Silica | 93.5 | 0.30 | Seal layer 1 | 6.5 | 1.0 | 0.12 |
| Example 17 | Honeycomb 3 | Silica | 95.0 | 0.30 | Seal layer 4 | 5.0 | 0.8 | 0.04 |
| Example 18 | Honeycomb 4 | γ-alumina + silica | 93.5 | 0.37 | Seal layer 1 | 6.5 | 1.0 | 0.12 |
| Example 19 | Honeycomb 4 | γ-alumina + silica | 97.0 | 0.39 | Seal layer 4 | 3.0 | 0.5 | 0.03 |
| Example 20 | Honeycomb 4 | γ-alumina + silica | 90.0 | 0.36 | Seal layer 2 | 10.0 | 1.5 | 0.19 |
| Example 21 | Honeycomb 4 | γ-alumina + silica | 98.5 | 0.39 | Seal layer 3 | 1.5 | 0.2 | 0.04 |
| Example 22 | Honeycomb 5 | γ-alumina | 93.5 | 0.42 | Seal layer 1 | 6.5 | 1.0 | 0.12 |
| Example 23 | Honeycomb 5 | γ-alumina | 93.5 | 0.42 | Seal layer 4 | 6.5 | 1.0 | 0.06 |
| Example 24 | Cordierite | — | — | — | — | — | — | — |

[1]Ratio of Unit Area: the ratio of the total sum of the cross section area of the porosity honeycomb unit to the cross section area of the honeycomb structure. The ratio of the unit area is a value by calculating so as to make the porosity and the cell contained.
[2]A: The apparent density of the honeycomb unit obtained by multiplying a ratio of the volume of the honeycomb unit among the volume of the honeycomb structure; calculated from (Apparent Density of Honeycomb Unit) × (Ratio of Unit Area/100).
[3]Ratio of Seal Layer Area: The ratio of the total sum of the cross section area of the seal layer to the cross section area of the honeycomb structure.
[4]B: The apparent density of the seal layer obtained by multiplying a ratio of the volume of the seal layer among the volume of the honeycomb structure; calculated from (Apparent Density of Seal Layer) × (Ratio of Seal Layer Area/100)

Examples 2 to 23

The materials of the honeycomb unit 10 were mixed so as to become the amount shown in Table 1. A sealing paste was prepared so as to become the amount shown in Table 2, and the honeycomb structures 20 of the Examples 2 to 23 were produced in the same manner as in the Example 1 except that the combination of the honeycomb unit 10 and seal material, ratio of the unit area, ratio of the seal material area and thickness of the seal layer shown in Table 3 are designed.

Example 24

A commercially available cordierite carrier, which had alumina as a catalyst carrier layer inside through holes, was prepared. The cordierite carrier had a diameter of 135 mm and a length of 75 mm, a through hole having a hexagonal shape, and a wall part having a thickness of 0.18 mm at a cell density of 62 cells/cm² (400 cpsi). Then, a platinum nitrate solution of 0.25 mol/L was prepared. The platinum nitrate solution was made to absorb into the honeycomb carrier so that the amount of the platinum becomes 5.0 g/L at the weight of the platinum per unit volume of the honeycomb structure, and the honeycomb carrier was fired for 1 h at 600° C. In this way, the honeycomb structure of the Example 24 in which the platinum catalyst was carried was obtained. The specific surface area per unit volume of the obtained honeycomb structure was 25000 m²/L.

Apparent Density Measurement

The apparent densities of the honeycombs 1 to 5 as the honeycomb unit 10 and seal material 1 to 4 as the seal layer 26 were measured. The product A of the honeycomb unit 10 was calculated from the following Formula (2) by measuring the dry weight Ga (g) of the honeycomb unit 10 and the volume Va (cm³) of the outer shape of the honeycomb unit 10 and calculating the volume ratio Y (%) of the honeycomb unit 10 among the volume of the honeycomb structure 20. The product B of the seal layer 26 was calculated from the following Formula (3) by solidifying the sealing paste in the shape of a cube, cutting the solidified sealing paste to the square of 1 cm×1 cm, measuring the dry weight Gb (g) of the cut seal layer 26 and the volume Vb (cm³) of the outer shape of the seal layer 26, and calculating the volume ratio Z (%) of the seal layer 26 among the volume of the honeycomb structure 20. Since the length of the honeycomb unit 10 in the axial direction of the honeycomb structure 20 is the same as that of the seal layer 26, the above ratio Y is the same as the ratio of the unit area, and the above ratio Z is the same as the ratio of the seal layer area. Therefore, the product A can be calculated by (Apparent Density of Honeycomb Unit 10)×((Ratio of Unit Area)/100). The product B can be calculated by (Apparent Density of Seal Layer)×((Ratio of Seal Layer Area)/100).

$$A(g/cm^3) = (Ga/Va) \times (Y/100); \quad \text{Formula (2)}$$

$$B(g/cm^3) = (Gb/Vb) \times (Z/100); \quad \text{Formula (3)}$$

Porosity Measurement

The porosities of the Examples 1 to 24 were measured. This measurement was performed by a mercury porosimetry method based on JIS-R1655 by using automatic porosimeter auto pore III9405, manufactured by Shimadzu Corporation as a measuring instrument. The contents of JIS-R1655 are incorporated by reference herein. Concretely, the honeycomb unit 10 was cut to cubes of about 0.8 cm, and the cubes were subjected to an ultrasonic cleaning using ion exchanged water and dried. Then, the cubes were measured in the measured range of 0.1 µm to 360 µm using the above measuring instrument. In the range of 100 µm to 360 µm, the cubes were measured for every pressure of 0.1 psia, and measured for every pressure of 0.25 psia in the range of 0.1 µm to 100 µm.

Measurement of Specific Surface Area per Unit Volume

The specific surface area per unit volume of the honeycomb structure of the Examples 1 to 24 was measured. First, a BET specific surface area M ($m^2/g$) per unit weight of the honeycomb unit 10 was measured. The BET specific surface area was measured with a BET measurement apparatus (Micromeritics Flow Sorb II-2300, manufactured by Shimadzu Corporation) according to a one point method in conformity with Japanese Industrial Standards JIS-R-1626 (1996). The contents of JIS-R-1626 (1996) are incorporated by reference herein. Each cylindrical sample piece (15 mm in diameter×15 mm in height) was used for the measurement. Then, the measurement process calculated the apparent density N (g/L) of the honeycomb unit 10 from the weight and apparent volume of the honeycomb unit 10. The apparent density N (g/L) of the honeycomb unit 10 is the same value as Ga/Va× 1000 described above. The ratio of the unit area was set to L (%), and the specific surface area per unit volume C ($m^2/L$) of the Examples 1 to 24 was calculated from the following Formula (4). The specific surface area of the honeycomb structure herein represents the specific surface area per apparent volume of the honeycomb structure. Since the ratio L (%) of the unit area is the same as the volume ratio Y (%) of the honeycomb unit 10 as described above, Formula (4) is the same as Formula (5). The specific surface area per unit volume of the honeycomb unit 10 was calculated by the expression M×N. The measurement, the apparent density measurement and the porosity measurement were performed by using the honeycomb unit 10 prior to carriage of the catalyst (platinum).

Specific Surface Area $C$ ($m^2/L$)=($L$/100)×$M$×$N$;   Formula (4)

Specific Surface Area $C$ ($m^2/L$)=($Y$/100)×$M$×($Ga/Va$× 1000)×$N$;   Formula (5)

Measurement of Conversion Efficiency of Exhaust Gas

Figure 4:
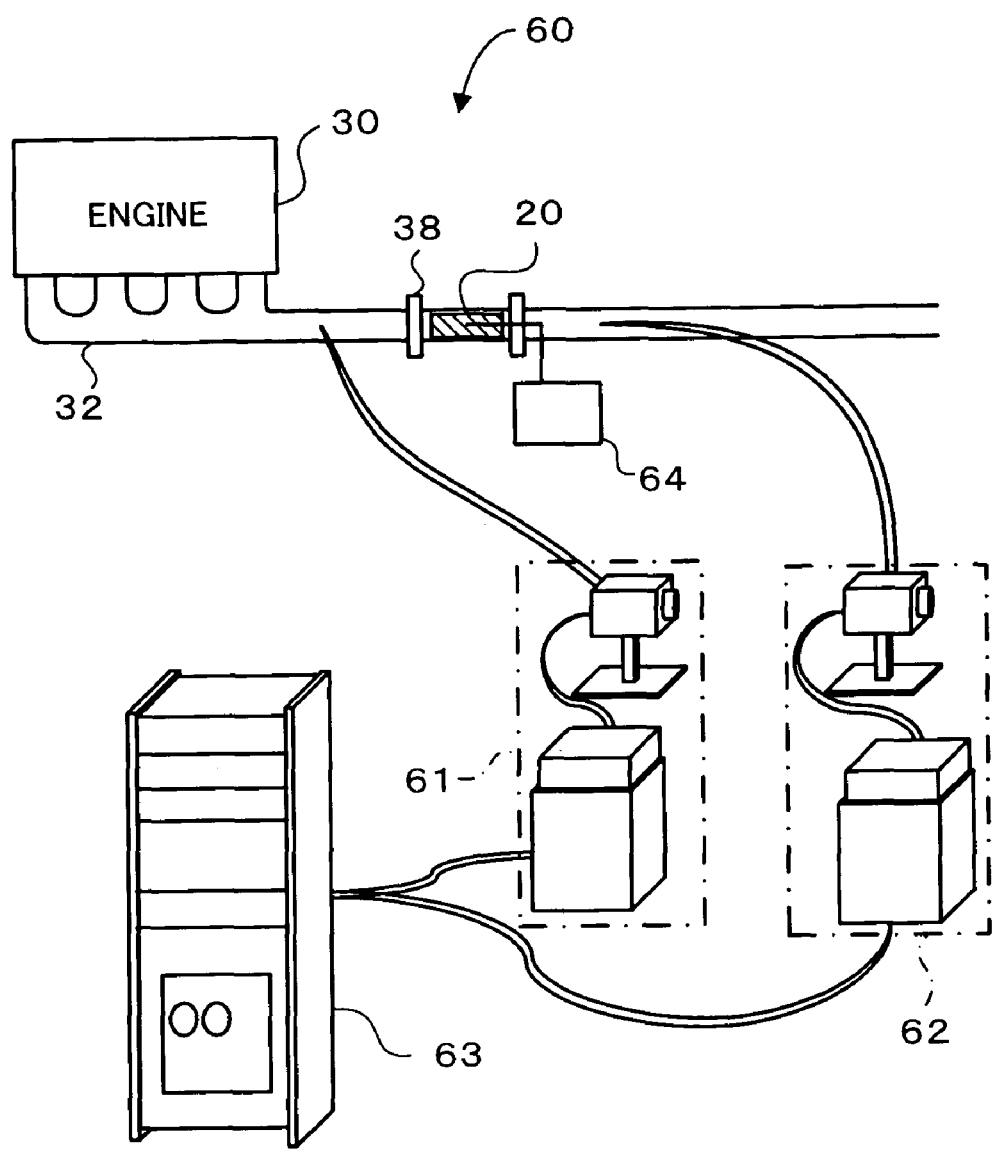
FIG. 4 is an explanatory view of an exhaust gas conversion measurement apparatus 60.

The conversion efficiency of the exhaust gas of each of the Examples 1 to 24 was measured. This measurement was performed using an exhaust gas-conversion measurement apparatus 60 shown in FIG. 4. The exhaust gas-conversion measurement apparatus 60 is constituted by an engine 30, a casing 38 in which the honeycomb structure 20 is fixed, a gas sampler 61 for sampling an exhaust gas before circulating the honeycomb structure 20, a gas sampler 62 for sampling an exhaust gas after circulating the honeycomb structure 20, a gas analyzer 63 for analyzing the concentration of toxic substances contained in the exhaust gas and a thermometer 64 for measuring the temperature of the honeycomb structure 20 using a thermo couple. The casing 38 was connected to a manifold 32 connected to the engine 30. Next, a measurement procedure will be described. First, the exhaust gas from the engine 30 was circulated into the Examples 1 to 24 described above. In this measurement, the engine 30 was driven so that cycles according to 10/15 mode exhaust gas measuring method of a diesel engine automobile were performed three times. The concentration of hydrocarbon (HC) and carbon monoxide (CO) contained in the exhaust gas sampled by the gas samplers 61, 62 was measured by the gas analyzer 63. The conversion efficiency was calculated from the following Formula (6) using the concentration CO contained in the exhaust gas before circulating the honeycomb structure 20 and the concentration Ci contained in the exhaust gas after circulating the honeycomb structure 20.

Conversion Efficiency (%)=($C0-Ci$)/$C0$×100;   Formula (6)

Experimental Results

Figure 5:
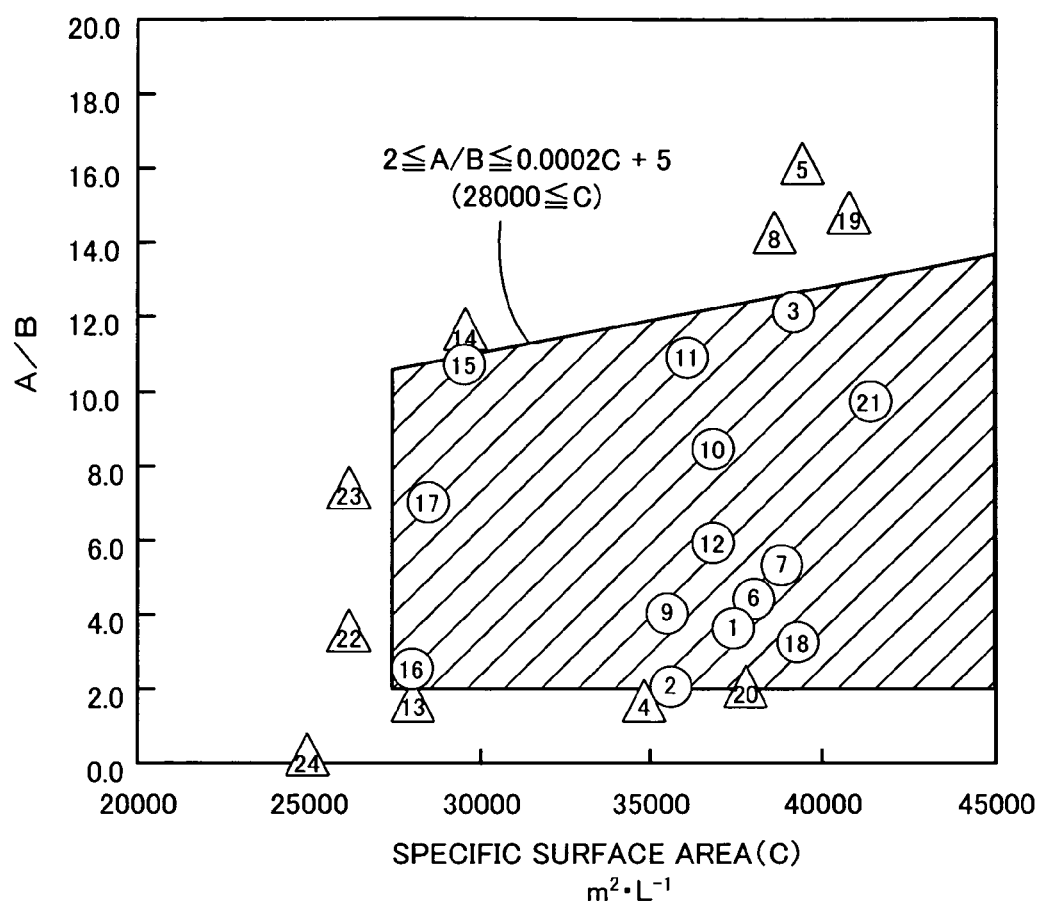
FIG. 5 is an explanatory view showing the relationship between A/B and a specific surface area C per unit volume.

Table 4 collectively shows the unit kind, kind of the seal layer, A, B, A/B, specific surface area C per unit volume of the honeycomb structure 20 and conversion efficiency of HC and CO among the exhaust gas or the like of the Examples 1 to 24. FIG. 5 is an explanatory view showing the relationship of the specific surface area per unit volume C and A/B obtained by plotting the specific surface area per unit volume C of the honeycomb structure 20 as the horizontal axis and A/B as the vertical axis referring to the Examples 1 to 24. In FIG. 5, ones satisfying Formula (1) described above were plotted as ○ (circle), ones not satisfying Formula (1) were plotted as Δ (triangle), and the sample number of each of the Examples was given to each point. As clearly shown in Table 4 and FIG. 5, referring to the samples of the Examples 1 to 3, 6, 7, 9 to 12, 15 to 18, and 21, that is, the samples included in the adequate range (the range satisfying Formula (1)) of FIG. 3, the conversion efficiency of HC and CO was 80% or more, and the conversion efficiency of the exhaust gas was high. When the specific surface area C was 35000 $m^2/L$ or more, the conversion efficiency tended to be further increased. The conversion efficiency of the exhaust gas is thought to be enhanced since the dispersibility of the catalyst is enhanced when the specific surface area C is increased. Herein, it was presumed that since the seal layer 26 covering the outer surface 13 of the honeycomb unit 10 plays the role of a keeping-warm material when $2 \leq A/B \leq 0.0002 \times C+5$ (about $28000 \leq C$) as the adequate range is satisfied and the temperature reduction of the honeycomb structure 20 is suppressed, the conversion efficiency of the exhaust gas is enhanced.

TABLE 4

|  | Unit | Seal Layer | A[1] g/cm³ | B[2] g/cm³ | A/B | Specific Surface Area C of Structure[3] m²/L | Conversion HC % | Efficiency CO % |
|---|---|---|---|---|---|---|---|---|
| Example 1 | Honeycomb 1 | Seal layer 1 | 0.42 | 0.12 | 3.6 | 37400 | 91 | 96 |
| Example 2 | Honeycomb 1 | Seal layer 1 | 0.40 | 0.20 | 2.0 | 35600 | 89 | 95 |
| Example 3 | Honeycomb 1 | Seal layer 1 | 0.44 | 0.04 | 12.1 | 39200 | 91 | 96 |
| Example 4 | Honeycomb 1 | Seal layer 1 | 0.39 | 0.24 | 1.7 | 34800 | 72 | 76 |
| Example 5 | Honeycomb 1 | Seal layer 1 | 0.44 | 0.03 | 16.2 | 39400 | 68 | 74 |

TABLE 4-continued

|  | Unit | Seal Layer | A[1] g/cm³ | B[2] g/cm³ | A/B | Specific Surface Area C of Structure[3] m²/L | Conversion HC % | Efficiency CO % |
|---|---|---|---|---|---|---|---|---|
| Example 6 | Honeycomb 1 | Seal Layer 2 | 0.43 | 0.10 | 4.4 | 38000 | 86 | 92 |
| Example 7 | Honeycomb 1 | Seal Layer 3 | 0.44 | 0.08 | 5.3 | 38800 | 87 | 92 |
| Example 8 | Honeycomb 1 | Seal Layer 4 | 0.43 | 0.03 | 14.3 | 38600 | 71 | 75 |
| Example 9 | Honeycomb 2 | Seal layer 1 | 0.47 | 0.12 | 4.0 | 35530 | 83 | 89 |
| Example 10 | Honeycomb 2 | Seal layer 2 | 0.49 | 0.06 | 8.4 | 36860 | 84 | 89 |
| Example 11 | Honeycomb 2 | Seal layer 4 | 0.48 | 0.04 | 10.9 | 36100 | 86 | 90 |
| Example 12 | Honeycomb 2 | Seal layer 3 | 0.49 | 0.08 | 5.9 | 36860 | 86 | 89 |
| Example 13 | Honeycomb 3 | Seal layer 3 | 0.30 | 0.18 | 1.7 | 28050 | 73 | 76 |
| Example 14 | Honeycomb 3 | Seal layer 1 | 0.32 | 0.03 | 11.5 | 29550 | 70 | 76 |
| Example 15 | Honeycomb 3 | Seal layer 2 | 0.32 | 0.03 | 10.9 | 29550 | 83 | 86 |
| Example 16 | Honeycomb 3 | Seal layer 1 | 0.30 | 0.12 | 2.5 | 28050 | 85 | 91 |
| Example 17 | Honeycomb 3 | Seal layer 4 | 0.30 | 0.04 | 7.0 | 28500 | 83 | 86 |
| Example 18 | Honeycomb 4 | Seal layer 1 | 0.37 | 0.12 | 3.2 | 39270 | 92 | 97 |
| Example 19 | Honeycomb 4 | Seal layer 4 | 0.39 | 0.03 | 14.9 | 40740 | 71 | 73 |
| Example 20 | Honeycomb 4 | Seal layer 2 | 0.36 | 0.19 | 1.9 | 37800 | 70 | 75 |
| Example 21 | Honeycomb 4 | Seal layer 3 | 0.39 | 0.04 | 9.7 | 41370 | 90 | 94 |
| Example 22 | Honeycomb 5 | Seal layer 1 | 0.42 | 0.12 | 3.6 | 26180 | 77 | 79 |
| Example 23 | Honeycomb 5 | Seal layer 4 | 0.42 | 0.06 | 7.4 | 26180 | 78 | 79 |
| Example 24 | Cordierite | — | — | — | — | 25000 | 67 | 72 |

[1] A: Apparent Density of Honeycomb Unit obtained by Multiplying Ratio of Volume of Honeycomb Unit among Volume of Honeycomb Structure; (Apparent Density of Honeycomb Unit) × (Ratio of Unit Area/100)
[2] B: Apparent Density of Seal Layer obtained by Multiplying Ratio of Volume of Seal Layer among Volume of Honeycomb Structure; (Apparent Density of Seal Layer) × (Ratio of Seal Layer Area/100)
[3] Specific Surface Area of Honeycomb Structure per Unit Volume The present application claims the benefit of priority from Japanese Patent Application No. 2005-190343 filed on Jun. 29, 2005, and from International Application No. PCT/JP2006/307955 filed on Apr. 14, 2006, the entire contents of which are incorporated by reference herein.

What is claimed is:

1. A honeycomb structure comprising:
    multiple honeycomb units having multiple through holes; and
    a seal layer which joins adjacent honeycomb units with each other via respective closed outer faces of the multiple honeycomb units on which the through holes are not opened,
    said honeycomb structure satisfying the expressions $2 \leq A/B \leq 0.0002 \times C+5$, and $C \geq 28000$, where A (g/cm³) represents a product of the apparent density of a honeycomb unit and volume ratio of the honeycomb unit to the whole honeycomb structure, B (g/cm³) represents a product of the apparent density of the seal layer and volume ratio of the seal layer to the whole honeycomb structure, and C (m²/L) represents a specific surface area per unit volume of the honeycomb structure.

2. The honeycomb structure according to claim 1, wherein the specific surface area C satisfies about 35000 m²/L or more.

3. The honeycomb structure according to claim 1, wherein the specific surface area C satisfies about 70000 m²/L or less.

4. The honeycomb structure according to claim 1, wherein the product A is about 0.2 g/cm³ to about 0.5 g/cm³.

5. The honeycomb structure according to claim 1, wherein a thickness of the seal layer is about 0.1 mm to about 2.0 mm.

6. The honeycomb structure according to claim 1, wherein the honeycomb unit contains inorganic particles and inorganic fibers, and the seal layer contains inorganic particles which are the same as or different from the inorganic particles contained in the honeycomb unit and inorganic fibers which are the same as or different from the inorganic fibers contained in the honeycomb unit.

7. The honeycomb structure according to claim 1, carrying a catalyst capable of converting an exhaust gas.

8. The honeycomb structure according to claim 1, wherein the honeycomb units contain one or multiple types of particles selected from the group consisting of alumina, silica, titania, zirconia, ceria, mullite, and zeolite.

* * * * *